United States Patent [19]
Morgan et al.

[11] Patent Number: 5,894,878
[45] Date of Patent: Apr. 20, 1999

[54] PROTECTIVE AND DECORATIVE COMPUTER COVER

[76] Inventors: Spencer T. Morgan, 927 Kreis La., Cincinnati, Ohio 45205; James A. Kinne, 4791 Rybolt Rd., Cincinnati, Ohio 45248

[21] Appl. No.: 08/726,097

[22] Filed: Oct. 4, 1996

[51] Int. Cl.$^6$ .................................................. A47H 23/00
[52] U.S. Cl. .................. 160/354; 160/352; 312/7.2; D6/610
[58] Field of Search .................................. 160/354, 352; 150/154, 165; D6/610; D14/114; 312/7.2; 248/918

[56] References Cited

U.S. PATENT DOCUMENTS

| | | |
|---|---|---|
| D. 322,430 | 12/1991 | Kline et al. . |
| D. 323,929 | 2/1992 | Hodson . |
| 2,598,072 | 5/1952 | Rose . |
| 2,705,208 | 3/1955 | Schweikert ........................ 160/352 X |
| 2,758,413 | 8/1956 | Woodruff . |
| 3,329,770 | 7/1967 | Rose ........................ 312/7.2 X |
| 3,995,674 | 12/1976 | Crawford . |
| 4,932,524 | 6/1990 | Hodson . |
| 5,072,998 | 12/1991 | Oh . |
| 5,104,088 | 4/1992 | Bakanowsky, III ............... D14/114 X |
| 5,115,345 | 5/1992 | Hobson et al. ................... D14/114 X |
| 5,429,142 | 7/1995 | Szabo et al. . |
| 5,464,214 | 11/1995 | Giffin ........................ 312/7.2 X |
| 5,564,209 | 10/1996 | Zagnoli . |
| 5,664,673 | 9/1997 | Perry ........................ 248/918 X |

*Primary Examiner*—Blair Johnson
*Attorney, Agent, or Firm*—Steven J. Rosen

[57] ABSTRACT

A covered casing assembly includes a fabric member made of an elastic material, such as a Spandex containing material, that is stretched over a casing and having at least one opening surrounding an accessible feature of the casing. The fabric member may be in the form of a tube having two openings, one at each end of the openings at each. end of the tube. An aperture adjustment feature is provided for sizing and shaping an aperture in the fabric member. Such a feature may be tabs formed by slits extending into the fabric member from around a periphery of the opening and the tabs are bent under the fabric member between the fabric member and the casing. Another more particular embodiment of the invention includes symbols or a design printed on an outside of the tube.

The present invention also includes a method for covering the computer monitor by stretching the tube over the casing and adjusting the opening to surround the screen using the features of the claimed assembly.

20 Claims, 3 Drawing Sheets

5,894,878

PROTECTIVE AND DECORATIVE COMPUTER COVER

BACKGROUND OF THE INVENTION

1. Field of the Invention

This invention relates generally to a cover for computers and, more particularly, to a cover made of elastic fabric, preferably SPANDEX, which is stretched over a computer component such as a monitor and has size adjustable apertures to permit access features of the computer such as a screen of the monitor.

2. Discussion of the Background Art

Personal computers have come into widespread use at home and in the office and with it a need for covering the computers for reasons ranging from protective to decorative. Many types of computer covers and other protective devices for computers have appeared on the market including covers which can be draped over computers but which must be removed during use. One type of cover is disclosed in U.S. Pat. No. 4,932,524 and overcomes this deficiency with a fabric member configured to conform to the general shape of the computer and which is sufficiently porous to permit effective heat dissipation and which is water resistant and static charge resistant. The fabric member contains at least one flap located in such a manner as to permit access to a disk drive access slot in the computer and which is capable of being closed after disk insertion and removal. The cover may also contain at least one opening which is located so as to permit access to external ports in the computer and to permit the cooling fan in the computer to vent without substantial interference. They must be removed, in order to permit the computer to be used. However, one problem with such a cover is its complexity and need to be tailored for each application. This problem is made worse because computer components are made by many different manufacturers and in many different sizes and shapes. A conventional computer cover or any of those found in the prior art do not fit both a monitor and a CPU case. Furthermore, many monitor covers do not fit different monitors having different shapes and sizes. This lack of universality drives up the cost of such covers, thus, making them less commercially appealing.

The present invention provides a more universal computer component and cover assembly having broad application such that one cover is easily adaptable for use with different components having different sizes and shapes.

SUMMARY OF THE INVENTION

A covered casing assembly includes a fabric member made of an elastic material, such as a Spandex containing material, that is stretched over a casing and having at least one opening surrounding an accessible feature of the casing. The fabric member may be in the form of a tube having two openings, one at each end of the tube. Another embodiment of the present invention further includes an aperture adjustment feature for sizing and shaping an aperture in the fabric member. A more particular embodiment of the aperture adjustment feature provides tabs formed by slits extending into the fabric member from around a periphery of the opening and the tabs are bent under the fabric member between the fabric member and the casing. Another more particular embodiment of the invention includes symbols or a design printed on an outside of the tube.

A particular application of the present invention provides a covered monitor assembly for a computer monitor having a casing, a cathode ray tube supported within the casing, a monitor screen disposed in a screen aperture of the casing, and a fabric member in accordance with the present invention stretched over the casing. The fabric member is made from an elastic material, is preferably in the shape of a tube, and has at least one opening surrounding at least a portion of a monitor screen. It may also include an aperture adjustment means which in one embodiment includes tabs formed by slits extending into the fabric member from around a periphery of the opening and the tabs are bent under the fabric member between the fabric member and the casing. A more particular embodiment provides the casing with a box section around the screen and an apertured cooling section surrounding a gun section of the cathode ray tube and the tube is stretched over the box casing so that cooling apertures in the apertured cooling section are substantially uncovered by the tube.

The fabric member in the form of the tube may be formed from a sheet of the elastic material and has a seam extending along a length of the tube. The fabric member is stretched over the casing with the seam along a bottom of the screen.

The present invention also includes a method for covering the computer monitor by stretching the tube over the casing and adjusting the opening to surround the screen using the features of the claimed assembly.

ADVANTAGES OF THE INVENTION

The present invention provides a covered assembly with one cover that can fit different computer components that come in different sizes and shapes. Another advantage of the present invention is that the cover of the present invention may be easily adapted to different size screens when used in conjunction with a computer monitor. This advantage of universality leads to another advantage which is lower costs both in manufacturing and inventory. The present invention provides a low cost advertising and promotional apparatus that can and is desired to be used in offices and homes because of its utility in protecting computer components as well as providing a decorative cover for what may be considered otherwise bland looking computer components.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
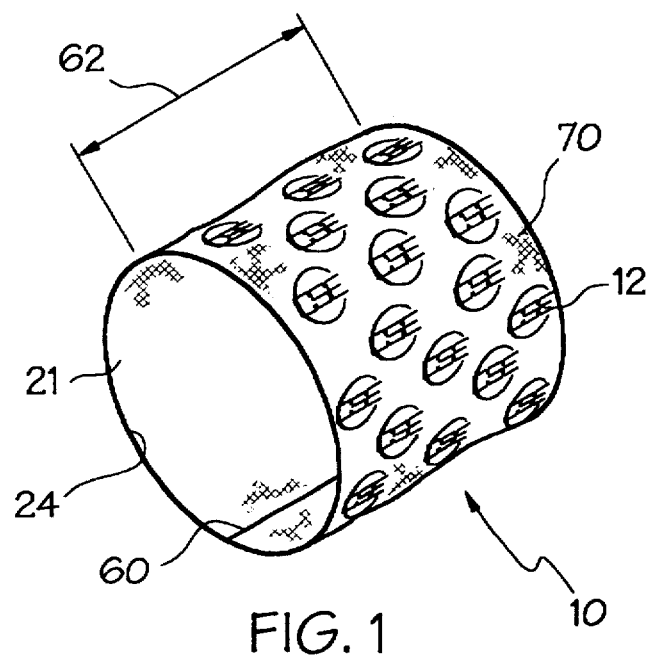
FIG. 1 is a perspective view illustrating a fabric member in the form of a tube made of an elastic material in accordance with an exemplary embodiment of the present invention.
Figure 2:
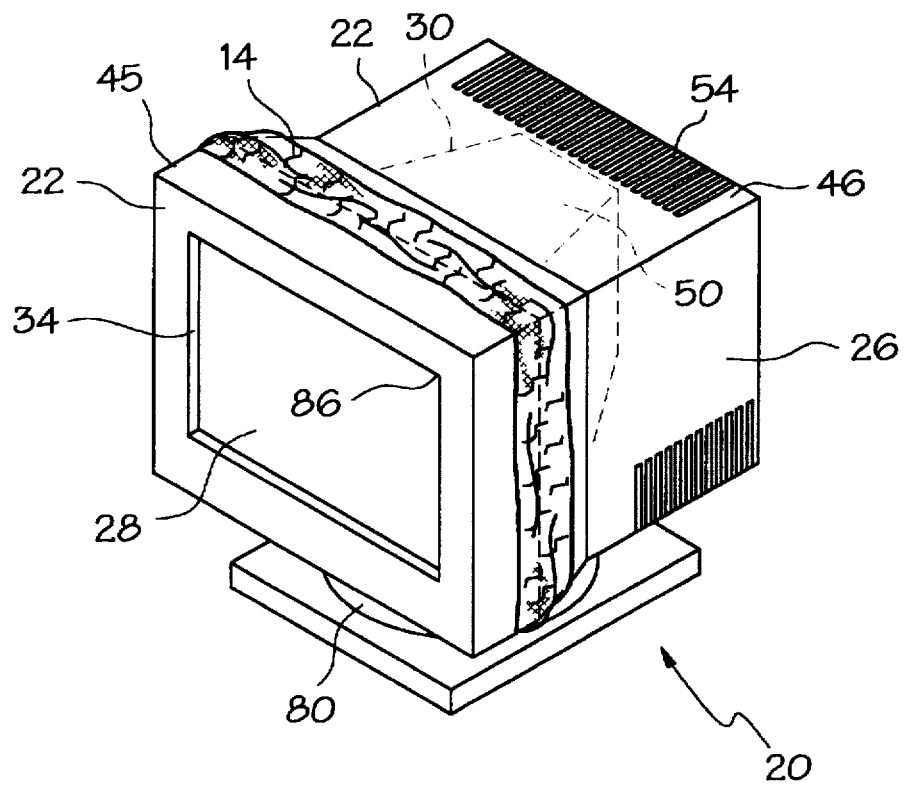
FIGS. 2–4 are perspective views illustrating steps for covering a computer monitor assembly with a tubular fabric member in accordance with another exemplary embodiment of the present invention.

Referring now to the drawings in detail wherein identical numerals indicate the same elements throughout the figures. FIGS. 1 and 2 illustrate two different exemplary embodiments of a preferably tubular fabric member 10 having symbols 12 illustrated as company logos in FIG. 1 and a decorative design 14 as shown in the remaining FIGS. 2–7. FIG. 2 illustrates more fully the present invention, a covered casing assembly in the form of a covered monitor assembly 20 which includes the fabric member 10 made of an elastic material 21, such as a Spandex containing material, that is stretched over a casing 22 and having at least one opening 24 surrounding an accessible feature of the casing. The computer component of the exemplary embodiment is a computer monitor 26 and its accessible feature of the casing 22 is a monitor screen 28.

The covered monitor assembly 20 is particularly well suited for illustrating the present invention because of its prominent presence in so many homes and offices. The computer monitor 26 supports within its casing 22 a cathode ray tube 30 which includes the monitor screen 28 disposed in a screen aperture 34 of the casing. The tubular fabric member 10 in accordance with the present invention is stretched over the casing 22 so that the opening 24 surrounds at least a portion of the screen 28. Preferably, the tubular fabric member 10 has an aperture adjustment means 40, for sizing and shaping an aperture in the fabric member, which includes tabs 42 formed by slits 44 extending into the tubular fabric member from around a periphery 48 of the opening 24 and the tabs are bent under the tubular fabric member between the tubular fabric member and the computer monitor 26 or the casing 22. The slits 44 are preferably cut by an end user when "dressing" the casing.

The casing 22 has a conventional box section 45 around the screen 28 and an apertured cooling section 46 surrounding a gun section 50 of the cathode ray tube 30 and the tubular fabric member 10 is stretched over the box section so that cooling apertures 54 in the apertured cooling section are substantially uncovered by the tubular fabric member. The tubular fabric member 10 has two openings, one at each end of the tubular fabric member but other types of fabric members are contemplated in different embodiments such as a bag shape with one opening or one large opening and several smaller apertures having the tabs 42 formed by slits 44 extending into the fabric member from around a periphery 48 of the smaller apertures which provide the aperture adjustment means of the present invention.

Figure 3:
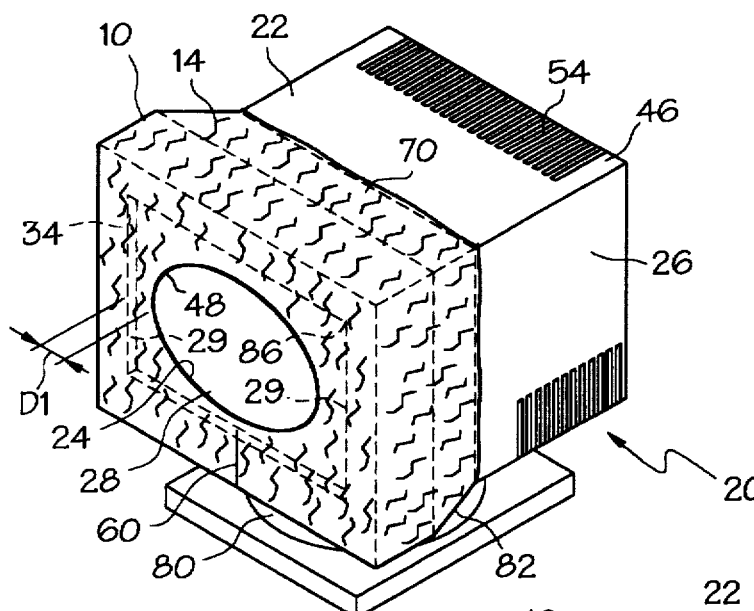
Figure 4:
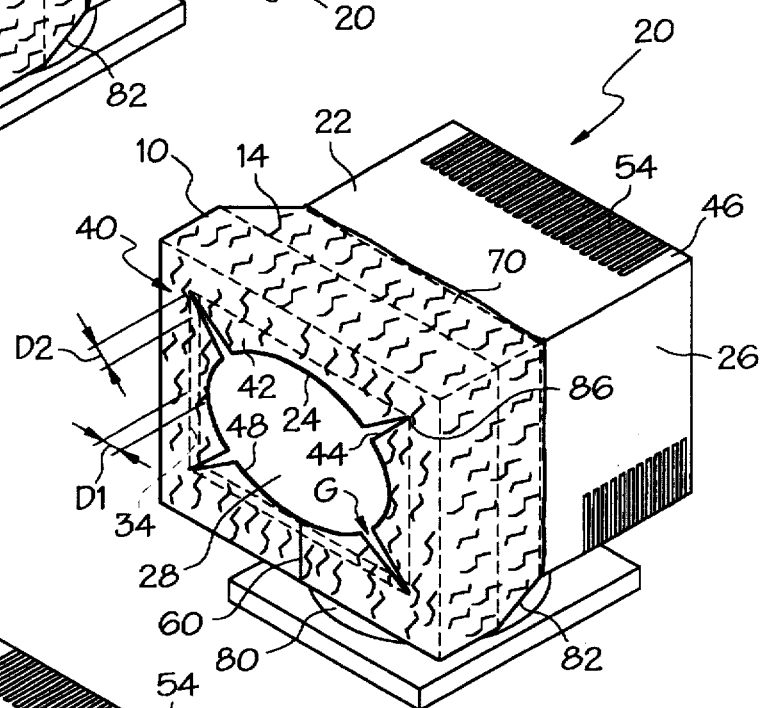
Figure 5:
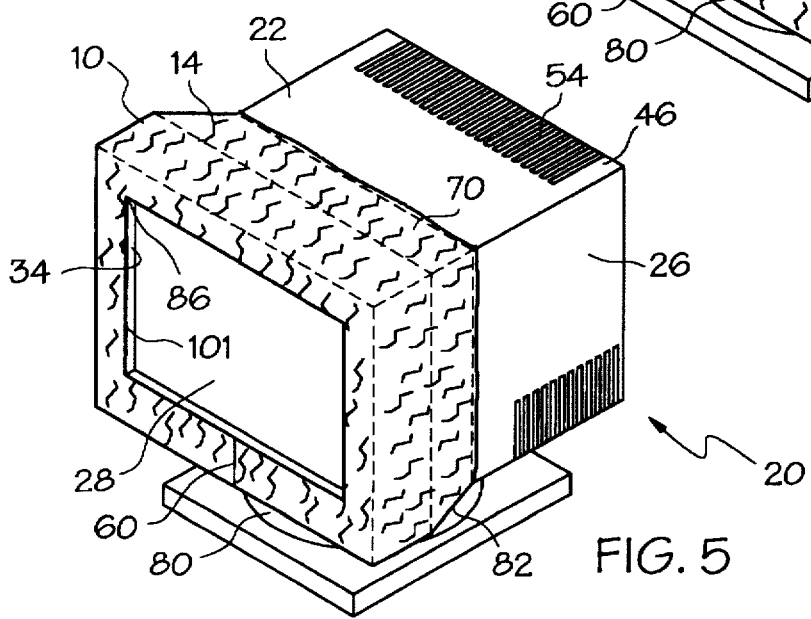
FIG. 5 is a perspective view illustrating the computer monitor assembly with the tubular fabric member fully installed and a last step following the step illustrated in FIG. 4 for covering the computer monitor assembly with the tubular fabric member.

The tubular fabric member 10 may be formed from a sheet of the elastic material 21 such as a Spandex containing material and have a seam 60 extending along a length 62 of the tubular fabric member or it may be a seamless tube. The tubular fabric member 10 is stretched over the monitor casing 22 with the seam 60 along a bottom 82 of the monitor casing. A typical Spandex containing material usually has a shiny outside 70 which provides an excellent surface for printing the symbols 12 or company logos in FIG. 1 or the decorative design 14 as shown in FIGS. 3–5.

The present invention also includes a method for covering the computer monitor by stretching the tubular fabric member 10 over the casing 22 and adjusting the opening to surround the screen 28 using the features of the claimed assembly.

If a swivel stand 80 is easily detached from the monitor casing 22, then, it should be removed to provide a better fit. Then the tubular fabric member 10 while bunched up should be stretched around the monitor casing 22 with the shiny outside 70 facing out and the seam 60 at the bottom 82 of the casing as shown in FIG. 3. Then, the tubular fabric member 10 should be fitted to straighten the seam 60 and smooth the elastic material 21 on all sides of the casing 22. The tubular fabric member 10 should be fitted such that it covers the screen 28 by at least a first amount D1 on all screen sides 29. I have found that about ½ inch is a good first amount D1 but one may need to try other amounts.

If the swivel stand 80 has been detached from the monitor casing 22, then, it should next be reattached. The elastic material is typically elastic enough that most swivel stand mounts can push through the material. Next, using a scissors or some other cutting tool, the slits 44 are preferably cut from the periphery 48 toward each corner 86 of the screen 28 so that it extends only partially up to a second amount D2 from the corners of the screen, thus, forming the tabs 42 between the slits 44. I have found that about ¼ inch is a good second amount. The material will relax forming a gap G of the slits 44 between adjacent tabs 42 as shown in FIG. 4 and the slits 44 should reach to the corners of the screen 28. More cutting may be needed to lengthen the slits 44 to further adjust the opening 24 and cause the slits 44 to extend to the corners 86 of the screen 28. Then, the tabs 42 are folded under the material on each screen side between the tubular fabric member 10 and the casing 22.

Figure 6:
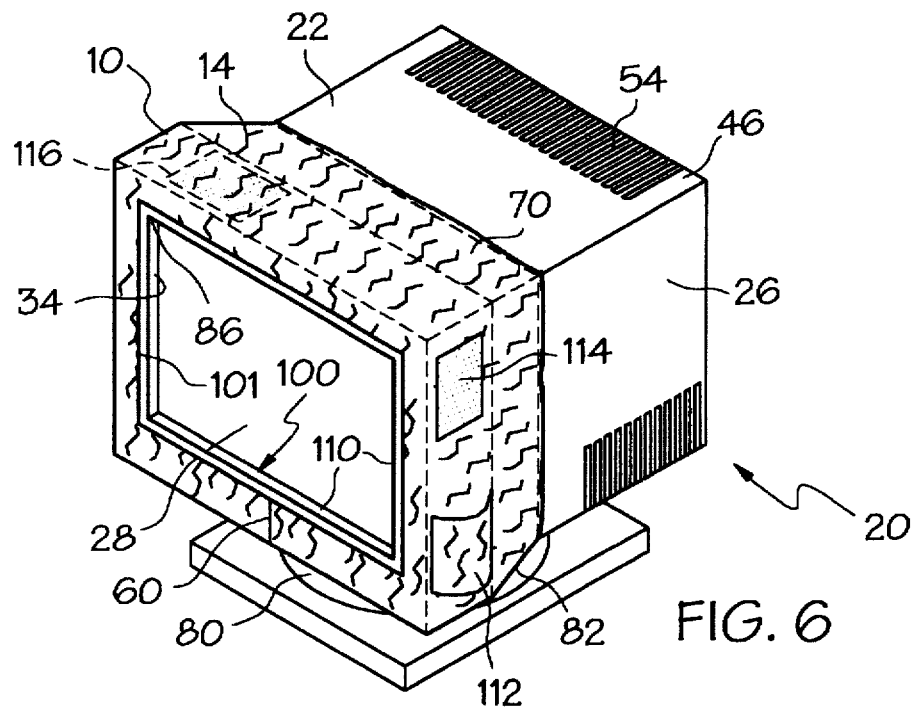
FIG. 6 is a perspective view illustrating additional features of other embodiments of the present invention.

Illustrated in FIG. 6 are additional features contemplated by the present invention which include a frame 100 which may be made of plastic and is attached to the tubular fabric member 10 along material edges 101 of the tabs 42 that bound the screen 28. The frame 100 includes frame sides 110 which may be telescoping or otherwise adjustable or may be of fixed size. The frame 100 may use two snap together parts which clamp the tubular fabric member 10 in between them. This provides a very well defined and neat clean edge around the periphery 48 of the opening 24 the tubular fabric member 10.

A pocket 112 may be attached to the tubular fabric member 10, which is useful for holding objects such as computer accessories, i.e. a mouse, or office utensils such as pens and pencils. The pocket 112 may be permanently attached to the tubular fabric member 10 or may be removably attached using double sided adhesive means such as an outer velcro patch 114. The outer velcro patch 114 may also be used to removably mount other accessories to the tubular fabric member 10. Another double sided adhesive means such as inner velcro patches 116 may be used on the inside of the tubular fabric member 10 to help adhere the tubular fabric member to the casing 22 in order to help hold the material in place.

Figure 7:
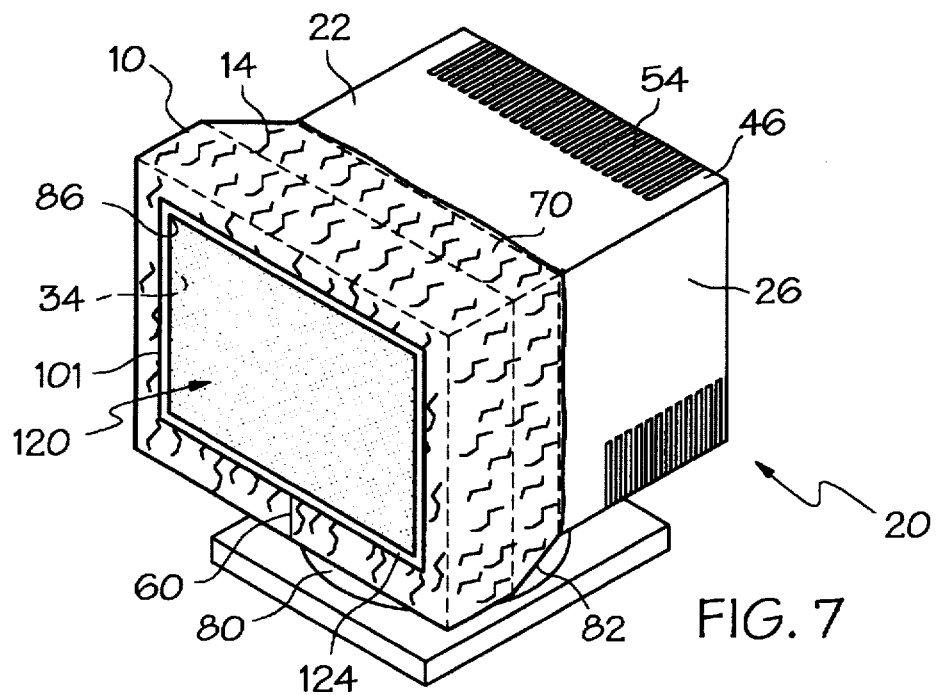
FIG. 7 is a perspective view illustrating additional another embodiments of the present invention including an anti-glare screen.

Illustrated in FIG. 7 is another feature contemplated by the present invention, an anti-glare screen 120 disposed within the screen aperture 34, in a similar manner to the frame 100. The anti-glare screen 120 may include a plastic frame 124 that is attached to the tubular fabric member 10 around the edge of the screen aperture 34.

While the preferred embodiment of our invention has been described fully, in order to explain its principles, it is understood that various modifications or alterations may be made to the preferred embodiment without departing from the scope of the invention as set forth in the appended claims.

What is claimed is:

1. A covered casing assembly comprising:
   a fabric member made of an elastic material comprising a tube with first and second openings at first and second ends respectively of said tube, said fabric member stretched over a casing, said first opening surrounding an accessible feature of said casing, and at least one aperture adjustment means for sizing and shaping an aperture of said first opening, wherein said aperture adjustment means comprises tabs formed by slits extending into said fabric member from around a periphery of said first opening and said tabs are bent under said fabric member between said fabric member and said casing.

2. An assembly as claimed in claim 1 wherein said fabric member further comprises symbols printed on an outside of said tube.

3. An assembly as claimed in claim 1 wherein said fabric member further comprises a design printed on an outside of said tube.

4. A covered casing assembly comprising:

a fabric member comprising an elastic material, said fabric member stretched over a casing, and said fabric member having at least one opening surrounding an accessible feature of said casing, an aperture adjustment means for sizing and shaping an aperture in said fabric member at said opening wherein said aperture adjustment means comprises tabs formed by slits extending into said fabric member from around a periphery of said opening and said tabs are bent under said fabric member between said fabric member and said casing.

5. An assembly as claimed in claim 4 wherein said fabric member further comprise an outside and has symbols printed on said outside of said fabric member.

6. An assembly as claimed in claim 4 wherein said fabric member further comprise an outside and has a design printed on said outside of said fabric member.

7. A covered monitor assembly comprising:

a computer monitor having a casing, a cathode ray tube supported within said casing and having a monitor screen disposed in a screen aperture of said casing, a fabric member stretched over said casing, said fabric member comprising an elastic material, and said fabric member having at least one opening surrounding at least a Portion of a monitor screen, and an aperture adjustment means comprising tabs formed by slits extending into said fabric member from around a periphery of said opening and said tabs are bent under said fabric member between said fabric member and said casing.

8. An assembly as claimed in claim 7 wherein said fabric member is a tube having two openings wherein one of said openings is at each of two ends of said tube.

9. An assembly as claimed in claim 8 wherein said casing comprises a box section around said screen and an apertured cooling section surrounding a gun section of said cathode ray tube and said tube is stretched over said box casing so that cooling apertures in said apertured cooling section are substantially uncovered by said tube.

10. An assembly as claimed in claim 9 wherein said fabric member is formed from a sheet of said elastic material and has a seam extending along a length of said tube and said fabric member is stretched over said casing with said seam along a bottom of said casing.

11. An assembly as claimed in claim 10 wherein said fabric member further comprises symbols printed on an outside of said tube.

12. An assembly as claimed in claim 11 wherein said fabric member further comprises a design printed on an outside of said tube.

13. An assembly as claimed in claim 10 further comprising a frame disposed within said aperture and attached to said tubular fabric member along edges of said tabs that bound said screen.

14. An assembly as claimed in claim 10 further comprising an anti-glare screen and disposed within said aperture and attached to said tubular fabric member along edges of said tabs that bound said screen.

15. An assembly as claimed in claim 10 further comprising at least one pocket attached to said tubular fabric member.

16. An assembly as claimed in claim 15 wherein said pocket is removably attached to said tubular fabric member by velcro means.

17. An assembly as claimed in claim 10 further comprising velcro means for attaching articles, said velcro means attached to an outside of said tubular member.

18. An assembly as claimed in claim 10 further comprising velcro means for securing and positioning said tubular member to said casing, said velcro means attached to an inside of said tubular member and to said casing.

19. A method to cover a computer monitor having a cathode ray tube supported within a computer monitor casing and having a monitor screen disposed in a screen aperture of the casing, said method comprising the following steps:

A) stretch a fabric member in the form of a tube comprising an elastic material around a computer monitor casing with a decorative side of the fabric member facing out, B) smooth the fabric member on all sides of the screen such that it covers the screen by at least a first amount on all sides such that an opening of the tube is stretched around an uncovered portion of the screen, C) adjust aperture size and shape of the opening that is stretched around the uncovered portion of the screen by cutting slits in the tube from around a periphery of the opening in a direction from a center of the screen toward corners of the screen and stopping the cutting about a second amount from the corners to form tabs between the slits, and D) bending the tabs under the fabric member between the fabric member and the casing.

20. A method as claimed in claim 19 wherein between steps C and D the material is allowed to relax and form a gap in the slits between adjacent tabs and a second cutting is performed such that the splits will extend up to the corners.

* * * * *